United States Patent

[11] 3,546,356

[72] Inventors Howard W. Graybill;
    Eli J. Faye, Greensburg, Pennsylvania
[21] Appl. No. 813,168
[22] Filed April 3, 1969
[45] Patented Dec. 8, 1970
[73] Assignee I-T-E Imperial Corporation
    Philadelphia, Pennsylvania
    a corporation of Delaware

[54] ELBOW CONSTRUCTION FOR HIGH VOLTAGE COMPRESSED-GAS-INSULATED CONDUCTORS
    5 Claims, 5 Drawing Figs.
[52] U.S. Cl. .................................................. 174/21,
    174/28, 174/71, 174/73, 174/87, 174/88
[51] Int. Cl. .................................................. H02g 15/24,
    H01b 9/04
[50] Field of Search .................................... 174/21,
    21.21, 21.3, 21.4, 22.2, 28, 70(B), 71, 71(B), 72,
    72(B), 73, 71(C), 86, 87, 88.2, 88(B), 99(B), 127

[56] References Cited
UNITED STATES PATENTS
| | | | |
|---|---|---|---|
| 477,951 | 6/1892 | Mezger .................. | 174/71 |
| 1,870,959 | 8/1932 | Morrison ........... | 174/21(.21)UX |
| 2,369,849 | 2/1945 | Phillips .................. | 174/21(.21) |
| 3,448,202 | 6/1969 | Whitehead .................. | 174/28 |

FOREIGN PATENTS
| | | | |
|---|---|---|---|
| 258,378 | 11/1967 | Austria .................. | 174/73 |

Primary Examiner—Laramie E. Askin
Attorney—Ostrolenk, Faber, Gerb and Soffen

ABSTRACT: An elbow structure for gas-insulated conductor assemblies of the high voltage type wherein substantially universal components are employed. In joining sections of bus runs at locations where bends or turns are necessitated due to the terrain or other practical considerations, substantially concentrically alined inner and outer conductive spheres are provided. The spacing between opposing surfaces of the spheres is at least equal to the spacing of the inner conductor and outer enclosure of the bus run sections which they join. The outer spherical member has a radius which greatly exceeds the natural radius of curvature of the bend or curved portion which is to be joined to thereby maintain uniformly high withstand and corona inception voltages. The outer spherical shape member may be machined at any predetermined locations for joining bus run sections at the location of a "bend" or turn to enable the provision of a universal angle elbow assembly which may be utilized to join adjacent bus run sections at substantially any desired angle.

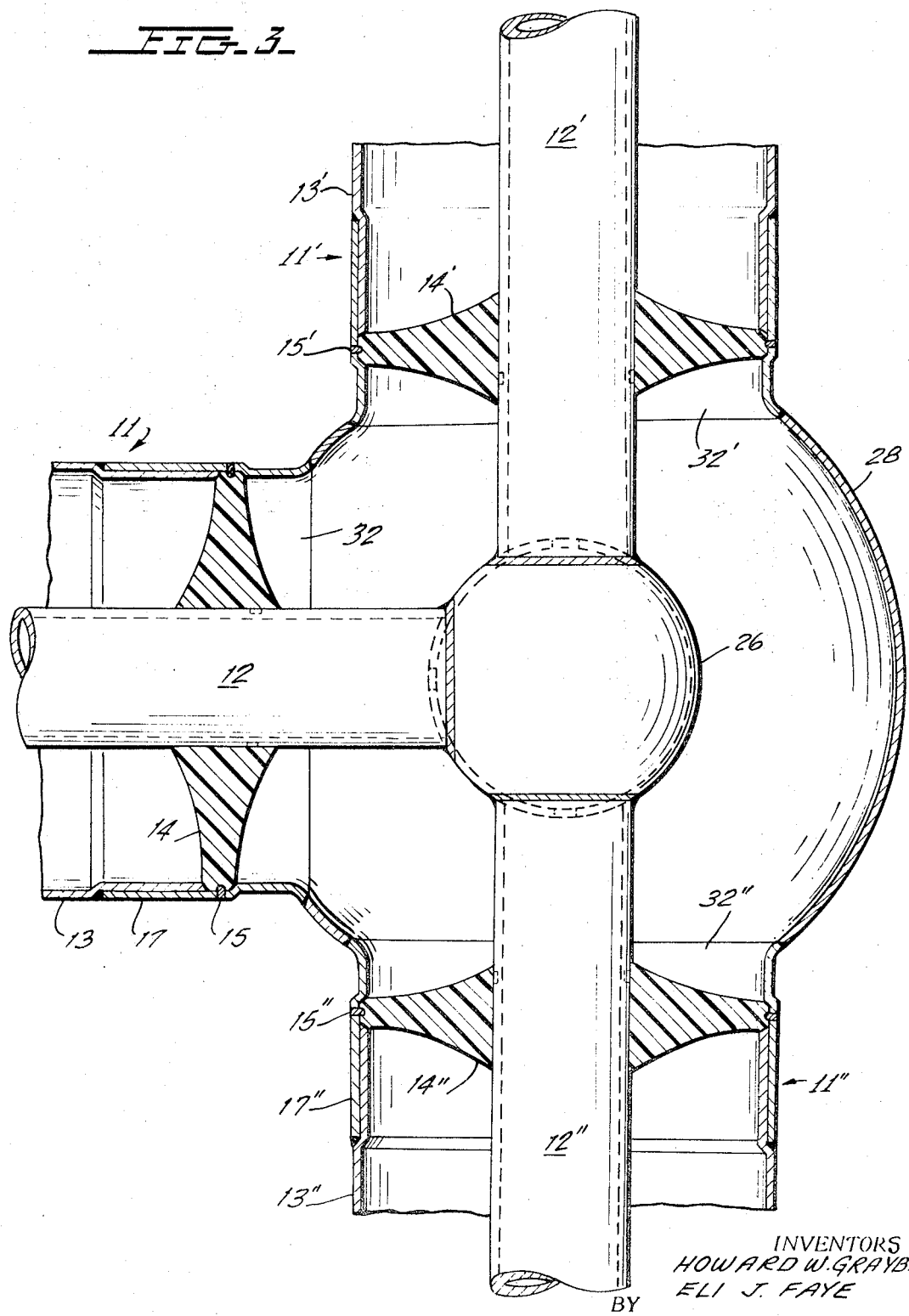

ELBOW CONSTRUCTION FOR HIGH VOLTAGE COMPRESSED-GAS-INSULATED CONDUCTORS

The present invention relates to gas-insulated conductor assemblies and more particularly to a novel universal elbow construction for joining adjacent sections whose alignment deviates from a coaxial straight line condition and may deviate from the straight line alignment over a substantially large angular range.

The universal elbow construction of this invention is extremely advantageous for use with metal-enclosed high-voltage electrical conductor assemblies in which a metallic conductor, generally tubular, is centrally supported and coaxially aligned within a grounded metal tube of larger diameter by means of solid disc or cone insulators. Such structures are shown in detail in copending applications Ser. No. 809,889 filed Mar. 24, 1969 and Ser. No. 813,181 filed Apr. 3, 1969, which applications have been assigned to the assignee of the present invention. The high voltage ratings of such assemblies dictate the use of a compressed gas within the enclosure interior which in preferred embodiments is typically sulfur-hexafluoride.

In order to achieve the greatest economy and therefore facilitate the widespread use of such structures, it has been recommended that the assemblies be preassembled in the factory to the greatest extent possible so as to significantly reduce the time, complexity and hence expense of field installation activities. Regardless of all of the techniques which have been developed up to the present time in an effort to reduce the cost of such systems, it is recognized that certain complex and tedious installation problems are yet to be solved. One of the major problems in this area occurs in installations at which adjacent sections to be joined to one another are aligned in such a manner (due to terrain or other practical considerations) as to require a "bend" or curvature at such junctures. The significance of these problems is magnified if the angle of the bend is high, say of the order of 90° or more, if the radius of the bend in the conductor is short, and if the voltage between the inner conductor and the enclosure is high, for example, of the order of 200,000 volts. In systems of such large voltage ratings there is a concentration of dielectric stress along the outer radius of the conductor. Thus the voltage gradient in the pressurized gas (SF-6) is much higher at this point than in straight portions of the conductor system, if the outside diameter of the conductor and the inside diameter of the enclosure are the same at all points. The dielectric stress concentration means that the power frequency and impulse withstand voltage would be lower in the region of such bends than would be the case elsewhere in the system.

There are several obvious methods which may be adopted to avoid the high voltage gradients in the region of such bends. One method suggested is that in which a very long radius bend, such as 10 feet or more, be provided. In most cases this is a highly impractical solution since space is normally at a premium and therefore dictates and limits the configuration and space allotted for a bend. Moreover, there is no practical process for bending relatively large-diameter, thin-walled enclosure tubing which can be carried out in an uncomplicated and economical fashion.

The second method of avoiding the above-stated problem is the employment of a larger diameter conductor tubing and a larger diameter enclosure tubing in the region of the bend. For example, the conductor tubing and enclosure tubing can be flared outwardly from the main portion of an assembly section toward the region of the bend so as to provide the largest diameters of conductor and enclosure in the bend region. A careful examination of this approach clearly indicates that the fabrication is quite complex and tedious thereby making the expense of such an approach prohibitive. Furthermore, for each new and different angle of deflection (for example 45°, 60°, 85° or 90°) new drawings, fabrication equipment and work instructions must be prepared and each conductor application must be fabricated in accordance with the specific drawings for the bend to be provided.

The present invention is characterized by providing a universal elbow structure capable of being employed in substantially all applications which may be confronted in any given installation so as to simplify manufacture of the components comprising a bend and further simplify and reduce components, of activity required at a field installation and further allowing the substantially large quantity production of a significantly small number of standard parts which yields an economy through such quantity production.

The universal elbow structure of the present invention is comprised of first and second hollow conductive spherical members fabricated in any suitable manner. The outer sphere is of significantly larger diameter and smaller wall thickness than the inner sphere so that the spherical components when appropriately joined to the adjacent ends of bus sections, provide a metal-to-metal clearance between inner and outer spheres which is at least equal to the clearance between conductor and enclosure members of bus sections in the remainder of the system. Also the concentration of dielectric stress is greatly reduced due to the increased radius along the exterior surface of the conductor in the region of the bend.

Each of the spheres may be fabricated by welding together two cast, spun or drawn hemispheres. The interior sphere may be provided with suitable openings to facilitate the passage of the compressed gas through the inside of the conductor. The ends of enclosures of adjacent bus sections to be joined at the bend are flared to provide a radius rather than a sharp edge at the point where the enclosure tubes are welded to the elbow structure outer sphere in order to avoid dielectric stress concentration that would otherwise develop at such edges. The location of the openings machined or otherwise formed within the inner and outer spheres may be easily determined by the particular orientation of the bus sections to be joined. The arrangement provides an economic way of simplifying manufacturing activities and field installation activities while at the same time maintaining uniformly high withstand and corona inception voltages at all points along the system being installed.

The structure is also adaptable for use in forming T-intersections of bus or any other similar arrangement requiring end-to-end connection of plural bus sections.

Although the prior art discloses the use of spherical shaped elements for bus terminations, the use of such elements in through or intersecting connections was heretofore not known.

It is therefore one object of the present invention to provide a novel universal elbow structure which greatly simplifies the joining of high voltage compressed-gas-insulated conductor assemblies which are aligned relative to one another at angles deviating either slightly or appreciable form coaxial orientation.

Another object of the present invention is to provide a novel universal elbow structure for joining transversely aligned bus sections of the high voltage compressed-gas-insulated type, the elbow construction being comprised of a pair of spherical conductive members arranged in concentric fashion and joined to adjacent bus sections at the location of a bend, the radii of the spheres being such as to maintain at least as high withstand and corona inception voltages in the region of the bend as are maintained throughout the remainder of the system.

These as well as other objects of the invention will become apparent when reading the accompanying description and drawings in which:

FIG. 1a is a detailed view of a portion of FIG. 1.

FIG. 3 is a sectional view showing another application of the present invention.

Figure 1:
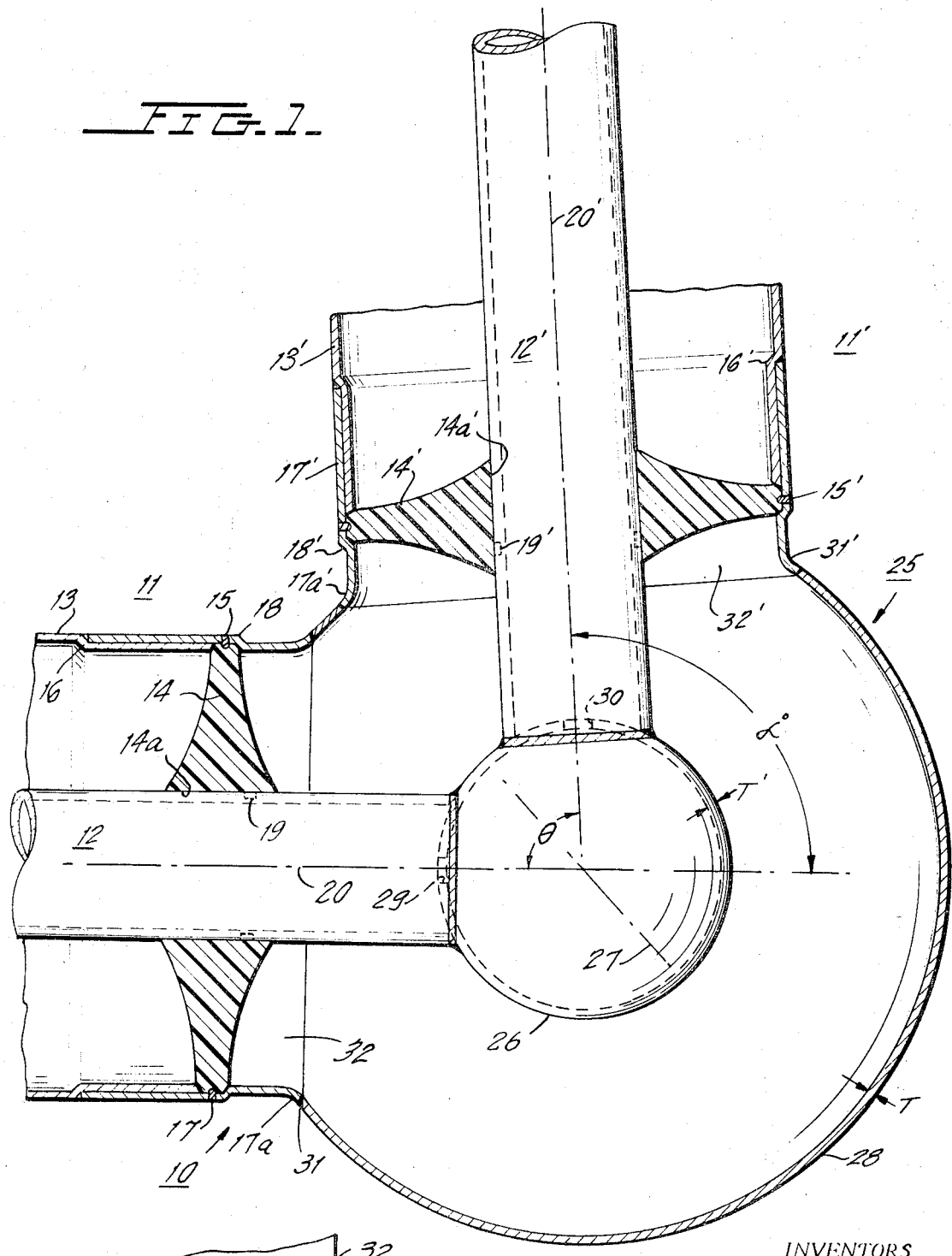
FIG. 1 is a plan view, partially sectionalized, showing two bus assemblies being joined at a bend through the use of the universal elbow structure of the present invention.
Figure 2:
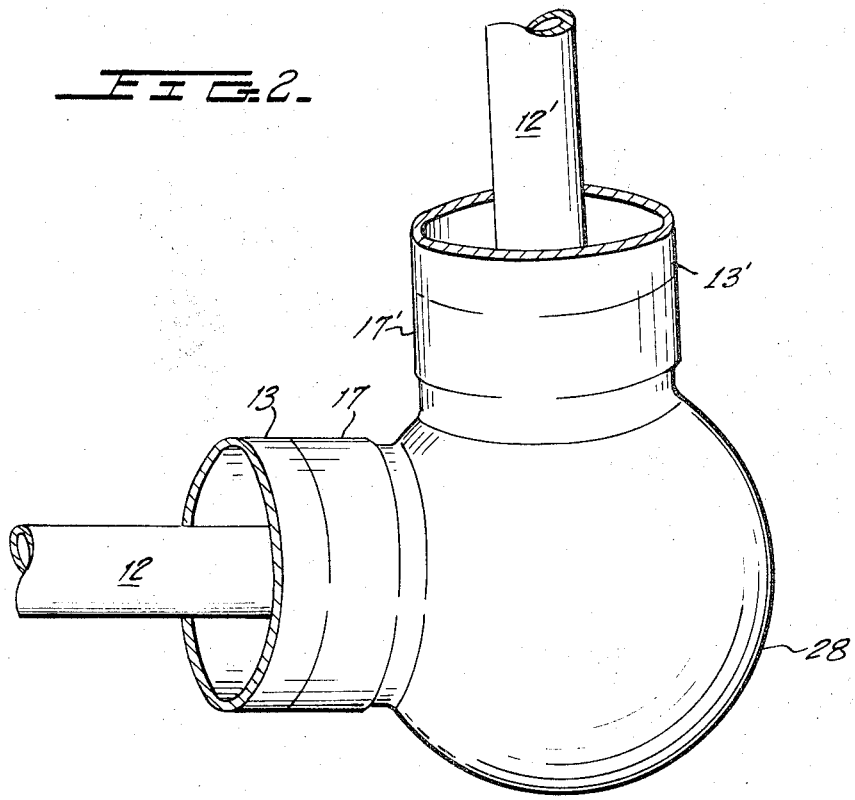
FIGS. 2 and 2a are perspective views of the embodiment of FIG. 1.
Figure 2A:
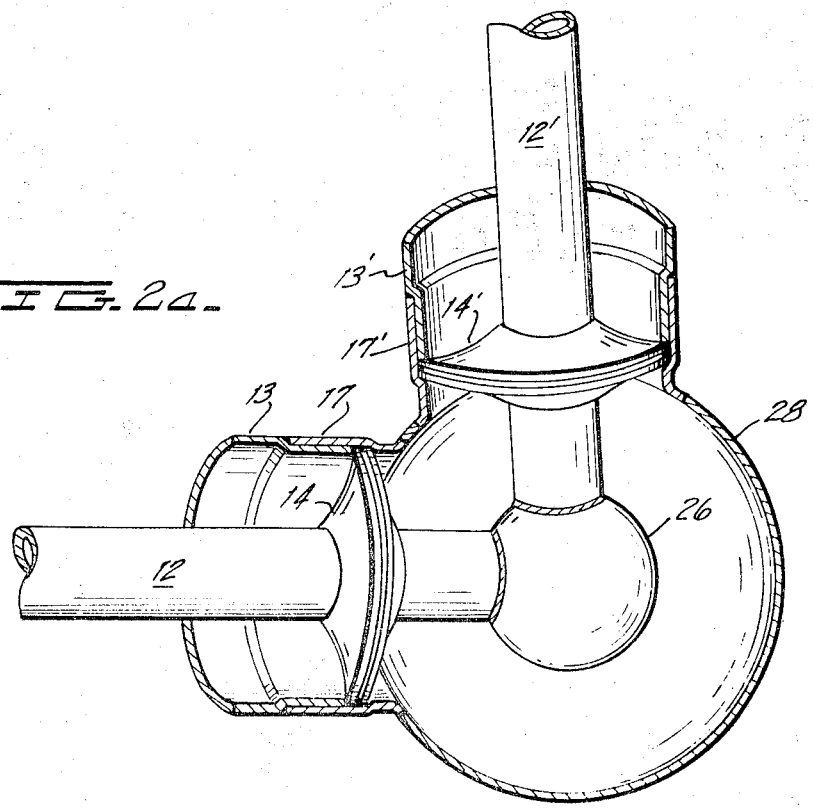

The structure 10 shown in the FIG. 1 is comprised of a first and second metal-enclosed high-voltage electrical conductor assemblies 11 and 11', only portions of which have been shown in the figure for purposes of simplicity. A more detailed configuration of such an assembly section is shown and likewise described in the above-mentioned copending applications. For purposes of the present invention it is sufficient to understand that each bus section is comprised of a central conductor 12, 12' and an outer conductive enclosure 13, 13' coaxially aligned with its associated inner conductor. Insulating spacers 14 and 14' (only one of which is shown in each of the assembly sections of the figure) are preferably arranged at spaced intervals along each bus section for supporting and positioning conductive members 12—13 and 12'—13' in coaxial alignment. The specific details relating to the manner in which the insulating spacers 14 and 14' are secured within each bus section will be omitted herein for purposes of simplicity, it being understood that the above-mentioned copending applications adequately cover such structures. The outer periphery of each insulating spacer 14 and 14' is provided with a continuous groove for receiving a suitable gasket 15, 15' to seal the region between the outer periphery of the spacer and the inner periphery of the bus section enclosure. The enclosure 13 and 13' is provided with a reduced diameter portion joining the remaining portion of the enclosure to form a shoulder 16, 16'. An end cover section 17, 17' is telescoped over the reduced diameter portion of each enclosure 13, 13'. Each end cover section has its own reduced diameter portion which forms a shoulder 18, 18'. Peripheral edges of the spacers 14, 14' are sandwiched between and thereby rigidly maintained by shoulder 18, and the marginal edge of the enclosure 13, 13'. The gasket 15, 15' (or other suitable sealing means such as, for example, an epoxy) fills the interior void defined by each spacer 14, 14' and the interior surface of end cover 17, 17' so as to seal the interior of the enclosure and thereby prevent the escape of any compressed gas. Techniques described in detail in the above-mentioned copending applications also provide means for sealing the region between the central openings 14a, 14a' of the spacers and the exterior surface of the conductors 12, 12'. This sealing means may take the form of a continuous gasket 19, 19' sandwiched between the opposing surfaces of the spacer and the inner conductor.

The longitudinal axes of the bus sections 11 and 11' are represented by the phantom lines 20, 20' respectively. It can be seen that these phantom lines intersect at an angle $\theta$ of just slightly less than 90°. Let it be assumed that the alignment between the two bus sections has been dictated as a result of terrain or other practical considerations. It now becomes important to provide a joining assembly capable of joining adjacent bus sections at any angle (within practical limits) while at the same time maintaining withstand voltages and corona inception voltages at least equal to those maintained within the remainder of the system.

These objectives are achieved by the elbow structure 25 shown in the figure which is comprised of a first relatively small-diameter, hollow, heavy-wall metallic sphere 26 having a diameter which is appreciably larger than the diameter of the conductors 12 and 12'.

The sphere 26 can be fabricated by welding together two cast, spun or drawn hemispheres. The two hemispheres may be joined by a continuous weld shown, for example, at 27. The outer surface of sphere 26 is preferably ground in the region of the welds to provide a smooth surface confronting the inner surface of the outer sphere 28 (to be more fully described).

The two conductors 12 and 12' are joined to sphere 26 preferably by welding so as to achieve the requisite mechanical strength and current-carrying capability. The juncture may be at any angle $\alpha$. Holes 29 and 30 may be drilled into the sphere 26 to facilitate passage of the compressed gas through the interior of one conductor (for example 12) and the interior of sphere 26 so as to pass to another conductor (for example 12').

The outer sphere 28 is of larger diameter than inner sphere 26 and has a wall thickness T which is substantially less than the wall thickness T' of sphere 26. In a like manner sphere 28 may be formed of two hemispheres fabricated through a casting, spinning or drawing operation, which hemispheres are welded together to form a continuous sphere.

The diameter of outer sphere 28 is such as to provide a metal-to-metal clearance between the confronting surfaces of spheres 26 and 28, that is at least equal to the clearance between the conductors and enclosures (for example 12—13 and 12'—13') elsewhere within the system. The two enclosures 13 and 13' are joined to sphere 28 by means of the end covers 17 and 17' which are welded to sphere 28 at junctures 31, 31' which surround openings 32, 32' which have been previously machined in sphere 28 at the appropriate angles.

After welding of the elbow enclosure assembly is completed, grinding of the welds on the inner surface of the sphere may be necessary as any inward protrusion from this surface would cause concentration of dielectric stress at such points.

The ends of the end covers 17 and 17' are flared at 17a, 17a' in the immediate region of the welds 31, 31' to provide a radius rather than a sharp edge at the point where the enclosures 13, 13' are welded to sphere 28. FIG. 1a shows a detailed view of one of the flared portions of FIG. 1. The smoothly formed radius avoids the occurrence of dielectric stress concentration that would otherwise form at a sharp edge. High concentration of dielectric stress anywhere in the system must be avoided to maintain uniformly high withstand and corona inception voltages.

FIG. 3 shows a sectional view of the present invention employed to form a T-intersection, in which bus sections 11, 11' and 11'' are electrically joined in a manner substantially identical to that shown in the other FIGS. Obviously the bus sections may be aligned at right angles or along a straight line or may deviate from these alignments since the universal application of the elbow construction allows for any such alignment. Certainly, more than three such bus sections may be joined in the manner taught herein if desired.

The foregoing description clearly indicates that the present invention provides a universal elbow construction capable of joining adjacent bus sections aligned at any angle (within practical limits) by means of a pair of concentrically aligned spherical elements which are designed so as to significantly reduce manufacturing and installation time and costs, reduce the number of components necessary for joining adjacent bus sections and further maintain corona inception and high withstand voltages at least as high as those found elsewhere in the system.

Although there has been described a preferred embodiment of this novel invention, many variations and modifications will now be apparent to those skilled in the art. Therefore, this invention is to be limited, not by the specific disclosure herein, but only by the appending claims.

We claim:

1. Means for rigidly joining at least two transversely aligned bus assemblies, each being comprised of an elongated central tubular conductor of a first diameter and a coaxially aligned elongated tubular conductive enclosure of a second larger diameter surrounding and insulated from said conductor, and insulating spacers being provided in each of said bus assemblies for spacing and aligning the conductors of said first and second diameters from one another; each of said bus assemblies being filled with a gaseous insulation material maintained under compression within said assemblies; said joining means comprising:

a first hollow conductive spherical member having a third diameter greater than said first diameter and less than said second diameter, said first member being joined to the conductors of said bus assemblies, the longitudinal axes of the conductors being colinear with respective radii of said first member;

a second hollow conductive spherical member having a fourth diameter substantially greater than said second diameter, said second member surrounding and concentrically aligned with and insulated from said first member;

said second member having first and second openings provided at spaced intervals along its surface;

the enclosures of said bus assemblies having their longitudinal axes aligned with respective radii of said second member and being joined to said second member at locations surrounding an associated one of said openings;

the interior surface of said second member and the exterior surface of said second member first member each being substantially smooth to maintain uniformly high withstand and corona inception voltages; and means for air-tightly sealing said second member to said enclosures of said second diameter to prevent escape of said compressed gaseous insulation material.

2. The assembly of claim 1 wherein the diameters of the said openings in said second member are at least as great as said second diameter.

3. The assembly of claim 1 wherein the ends of said enclosures joined to said second member are flared outwardly in the immediate region of the juncture between said enclosures and said second member to eliminate the occurrence of corona and arcing.

4. The assembly of claim 1 wherein said first and second members are each comprised of a pair of hemispheres welded together to form spheres.

5. Means for rigidly joining three transversely aligned bus assemblies, each being comprised of an elongated central tubular conductor of a first diameter and a coaxially aligned elongated tubular conductive enclosure of a second larger diameter surrounding and insulated from said conductor, and insulating spacers being provided in each of said bus assemblies for spacing and aligning the conductors of said first and second diameters from one another; each of said bus assemblies being filled with a gaseous insulation material maintained under compression within said assemblies; said joining means comprising:

a first hollow conductive spherical member having a third diameter greater than said first diameter and less than said second diameter, said first member being joined to the conductors of said bus assemblies, the longitudinal axes of the conductors being colinear with respective radii of said first member;

a second hollow conductive spherical member having a fourth diameter substantially greater than said second diameter, said second member surrounding and concentrically aligned with and insulated from said first member;

said second member having first, second and third openings provided at spaced intervals along its surface; and the enclosures of said bus assemblies having their longitudinal axes aligned with respective radii of said second member and being joined to said second member at locations surrounding an associated one of said openings.

UNITED STATES PATENT OFFICE
CERTIFICATE OF CORRECTION

Patent No. 3,546,356           Dated 8 December 1970

Inventor(s) Howard W. Graybill & Eli J. Faye

It is certified that error appears in the above-identified patent and that said Letters Patent are hereby corrected as shown below:

Column 5, line 12, delete "second member"

Signed and sealed this 9th day of November, 1971.

(SEAL)
Attest:

EDWARD M. FLETCHER, JR.          ROBERT GOTTSCHALK
Attesting Officer                Acting Commissioner of Patents